United States Patent [19]

Mitani et al.

[11] 4,327,145

[45] Apr. 27, 1982

[54] PROCESS FOR PRODUCING SHEET MOLDING COMPOUND

[75] Inventors: Tomomasa Mitani, Izumi; Yoshimi Ogasawara; Shunichi Hiraishi, both of Sakai, all of Japan

[73] Assignee: Dainippon Inc. & Chemicals, Inc., Tokyo, Japan

[21] Appl. No.: 175,408

[22] Filed: Aug. 6, 1980

Related U.S. Application Data

[63] Continuation-in-part of Ser. No. 87,381, Oct. 22, 1979, abandoned.

[51] Int. Cl.³ .............................................. C08K 7/14
[52] U.S. Cl. ..................... 428/290; 264/109; 264/128; 523/527
[58] Field of Search ................... 260/40 TN; 264/109, 264/128; 428/290

[56] References Cited

U.S. PATENT DOCUMENTS

| | | | |
|---|---|---|---|
| 3,824,201 | 7/1974 | McGranaghan et al. | 260/40 TN |
| 3,868,431 | 2/1975 | Hutchinson | 260/40 TN |
| 3,886,229 | 5/1975 | Hutchinson et al. | 260/40 TN |
| 3,933,728 | 1/1976 | Henbest | 260/40 TN |
| 4,062,826 | 12/1977 | Hutchinson et al. | 260/40 TN |
| 4,067,845 | 1/1978 | Epel et al. | 260/40 TN |

*Primary Examiner*—James H. Derrington
*Attorney, Agent, or Firm*—Sherman & Shalloway

[57] ABSTRACT

A process for producing an easily handleable sheet molding compound which comprises impregnating glass fibers with a resin composition comprising (A) an unsaturated polyester having a hydroxyl value of 20 to 55 and an acid value of 5 to 20 with a hydroxyl value/acid value ratio of from 1.7 to 10, (B) a polymerizable monomer and (C) a polyisocyanate compound having not more than 20 carbon atoms excepting the carbon atoms of the isocyanate groups and selected from the group consisting of diisocyanates and polymethylenepolyphenyl isocyanates, the proportions of the unsaturated polyester (A) and the polyisocyanate compound (C) being such that the mole ratio of the hydroxyl groups of the unsaturated polyester (A) to the isocyanate groups of the polyisocyanate compound (C) is from 0.7 to 1.3, and said composition being free from an oxide or hydroxide of magnesium or calcium, said impregnation being effected so that the glass fiber content becomes 40 to 75% by weight; and molding the resin-impregnated glass fibers into a sheet.

5 Claims, No Drawings

PROCESS FOR PRODUCING SHEET MOLDING COMPOUND

CROSS-REFERENCE TO RELATED APPLICATION

This application is a continuation-in-part application of U.S. Ser. No. 87,381 filed Oct. 22, 1979, now abandoned.

BACKGROUND OF THE INVENTION

This invention relates to a process for producing a sheet molding compound which is in the B-stage and is very easy to handle. More specifically, this invention relates to a process for producing an easily handleable sheet molding compound from a resin composition comprising an unsaturated polyester, a polymerizable monomer and a polyisocyanate compound and glass fibers.

Glass fibers impregnated with unsaturated polyester resins are used in fabricating a variety of articles such as fishing boats, bath tubs, tanks, pipes, containers, and chairs. In recent years, methods have been widely used for producing desired molded articles by using molding materials (so-called prepregs) which are free from the stickiness of resin-impregnated glass fibers. Among them, sheet molding compounds (to be referred to as "SMC") are in widespread use because of their high molding efficiency and freedom from pollution of the working environment. SMC is a B-stage resin-impregnated glass fiber sheet which is obtained by rendering the resin semi-solid (pre-gel) by forming a metallic bond between the carboxylic acid in the unsaturated polyester and an oxide of an alkaline earth metal such as MgO and CaO or a metal hydrate.

Since, however, this metallic bond is susceptible to water, the rate of solidification of the resin and the hardness of the resulting compound differ depending upon the water content of the system. Moreover, the resulting compound must be aged for more than 24 hours to remove tackiness so that it can be used in molding. This leads to the inconvenience that molding conditions should be made to correspond to the hardness of a given compound. Moreover, because a metallic compound is added, a high level of electric insulation cannot be imparted to the compound, and therefore, the compound is unsuitable for use in applications involving high voltages.

SUMMARY OF THE INVENTION

It is an object of this invention to provide a novel SMC which is free from the defects of such conventional SMC.

We have now found that an easily handleable sheet molding compound can be produced by a process which comprises impregnating a resin composition comprising (A) an unsaturated polyester having a hydroxyl value of 20 to 55 and an acid value of 5 to 20 with a hydroxyl value/acid value ratio of from 1.7 to 10, (B) a polymerizable monomer and (C) a polyisocyanate compound having not more than 20 carbon atoms excepting the carbon atoms of the isocyanate groups and selected from the group consisting of diisocyanates and polymethylenepolyphenyl isocyanates, the proportions of the unsaturated polyester (A) and the polyisocyanate compound (C) being such that the mole ratio of the hydroxyl groups of the unsaturated polyester (A) to the isocyanate groups of the polyisocyanate compound (C) is from 0.7 to 1.3, and said composition being free from an oxide or hydroxide of magnesium or calcium, in (D) glass fibers so that the glass fiber content becomes 40 to 75% by weight, and molding the resin-impregnated glass fibers into a sheet; and that when the resulting sheet is allowed to stand, it solidifies to a B-stage within a short period of time to give an SMC having flexibility, high elastic recovery and ease of after-processing, and molded articles from the SMC have high strength and very high electric insulation.

DETAILED DESCRIPTION OF THE INVENTION

The unsaturated polyester (A) used in this invention is obtained by the polycondensation of a dibasic acid with a polyhydric alcohol. It can be easily impregnated in glass fibers, and loses tackiness within a short period of time upon reaction with the polyisocyanate compound. The unsaturated polyester (A) has a hydroxyl value of 20 to 55, preferably 25 to 40, and an acid value of 5 to 25, preferably 10 to 20 with the ratio of the hydroxyl value to the acid value being from 1.7 to 10, preferably from 2.5 to 7.0.

If the hydroxyl value of the unsaturated polyester (A) is less than 20, the surface of the resulting SMC does not become tack-free. If it exceeds 55, the reaction of the unsaturated polyester with the polyisocyanate compound proceeds too far, and the resulting SMC lacks flexibility and has very poor moldability. If the acid value of the polyester (A) is less than 5, its molecular weight exceeds 4500 and its viscosity becomes high. Hence, the resulting resin composition is not sufficiently impregnated in glass fibers and a molded article of high strength cannot be obtained. If the acid value exceeds 20, the molecular weight of the unsaturated polyester is less than 1500, and therefore, the strength of the resulting molded article decreases. If the ratio of the hydroxyl value to the acid value is less than 1.7, a molded article of sufficient hardness cannot be produced even if the hydroxyl value of the unsaturated polyester is 20 or more. If this ratio exceeds 10, the unsaturated polyester reacts with the polyisocyanate compound to increase the molecular weight of the resin composition, and the moldability of the resulting SMC is insufficient.

The dibasic acid as one component for producing the unsaturated polyester (A) includes known alpha, beta-unsaturated dibasic acids such as maleic acid, maleic anhydride, fumaric acid, itaconic acid, citraconic acid, mesaconic acid and chlorinated maleic acid. If desired, such alpha, beta-unsaturated dibasic acids may be used in combination with saturated dibasic acids such as phthalic anhydride, isophthalic acid, terephthalic acid, monochlorophthalic acid, dichlorophthalic acid, trichlorophthalic acid, Het acid, tetrachlorophthalic anhydride, tetrabromophthalic anhydride, endomethylenetetrahydrophthalic anhydride, tetrahydrophthalic anhydride, adipic acid, sebacic acid, succinic acid, glutaric acid and pimelic acid.

Examples of the polyhydric alcohol as the other component for producing the unsaturated polyester (A) are preferably dihydric alcohols such as ethylene glycol, propylene glycol, diethylene glycol, dipropylene glycol, triethylene glycol, 1,3-butylene glycol, 2,3-butylene glycol, 1,4-butylene glycol, neopentyl glycol, hexylene glycol, octylene glycol, bisphenol A, hydrogenated bisphenol A, bisphenol A/dioxyethyl ether adduct, bisphenol A/dioxypropyl ether adduct, ethylene oxide, propylene oxide and butylene oxide. If required, trihydric or higher alcohols such as trimethylol propane or glycerol may be used in combination with these dihydric alcohols.

The polymerizable monomer (B) is a compound which is liquid at room temperature, and contains an unsaturated double bond in the molecule. The polymerizable monomer includes unsaturated monomers such as styrene, alpha-methylstyrene, vinyltoluene, chlorostyrene, (meth)acrylic acid, alkyl (meth)acrylates, acrylonitrile, vinyl acetate, allyl acetate, triallyl cyanurate, triallyl isocyanurate, and acrylamide. Styrene and methyl methacrylate are especially preferred. A normally solid polymerizable monomer such as diacetone acrylamide can also be used as a solution in the aforesaid normally liquid polymerizable monomer.

Diisocyanates having not more than 20 carbon atoms excepting the carbon atoms of the isocyanate groups, and polymethylenepolyphenyl isocyanates are used as the polyisocyanate compound (C).

The diisocyanates are those represented by the general formula

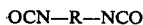

OCN—R—NCO in which R represents an aliphatic, aromatic or alicyclic divalent radical. Suitable diisocyanates for use in this invention are those of the above formula in which R represents an alkylene group having not more than 20 carbon atoms, preferably 6 to 16 carbon atoms, a phenylene group, an alkyl-substituted phenylene group, a xylylene group, a diphenylene group, a diphenylene group with the phenylene groups being bonded to each other by an oxygen or sulfur atom or an alkylene group, a naphthylene group, or a cyclohexylene group.

Specific examples of the diisocyanates include aliphatic diisocyanates such as trimethylene diisocyanate, tetramethylene diisocyanate, pentamethylene diisocyanate, heptamethylene diisocyanate, octamethylene diisocyanate, nonamethylene diisocyanate, decamethylene diisocyanate, 1,2-propane diisocyanate, 1,2-butane diisocyanate, 1,2-pentane diisocyanate, 1,3-pentane diisocyanate, 1,4-hexane diisocyanate, 1,5-hexane diisocyanate and 2,2'-diisocyanate diethyl ether; aromatic diisocyanates such as 2-benzylpropanediisocyanate-1,3, 2,4-diphenylhexane-diisocyanate-1,6, p-phenylene diisocyanate, m-phenylene diisocyanate, 4,4'-diphenyl diisocyanate, 1,4-naphthylene diisocyanate, 1,5-naphthylene diisocyanate, 2,6-naphthylene diisocyanate, 2,4-tolylene diisocyanate, 2,6-tolylene diisocyanate, xylylene diisocyanate-1,3, xylylene diisocyanate-1,4, 4,4'-diisocyanate diphenyl ether, and 4,4'-diisocyanate diphenyl methane; and alicyclic diisocyanates such as 1,4-cyclohexane diisocyanate and 1,3-cyclohexane diisocyanate.

Usually, a triisocyanate of the formula

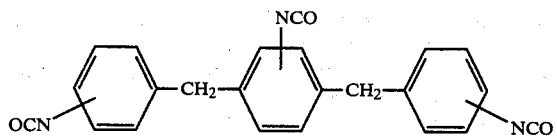

is used as the polymethylenepolyphenyl isocyanate.

The amount of the polyisocyanate compound (C) is that which provides a mole ratio of the hydroxyl groups of the unsaturated polyester (A) to the isocyanate groups of the polyisocyanate compound (C) of from 0.7 to 1.3. Preferably, the polyisocyanate compound (C) is used in such an amount that all of its isocyanate groups react with the hydroxyl groups of the unsaturated polyester (A) (that is, the aforesaid mole ratio is 1).

The polymerizable monomer (B) is used in an amount of 25 to 70%, preferably 30 to 50%, based on the total weight of the unsaturated polyester (A) and the polymerizable monomer (B).

If required, the resin composition comprising the unsaturated polyester (A), the polymerizable monomer (B) and the polyisocyanate compound (C) may include a polymerization inhibitor such as hydroquinone, benzoquinone, toluhydroquinone or t-butyl catechol. It may also contain conventional curing catalysts such as benzoyl peroxide, methyl ethyl ketone peroxide, lauroyl peroxide, cumene hydroperoxide, dicumyl peroxide and t-butyl perbenzoate; conventional promoters such as dimethylaniline and cobalt naphthenate; conventional urethanization catalysts such as cobalt octoate and dibutyltin dilaurate; conventional fillers such as calcium carbonate, clay and aluminum hydroxide; conventional mold releasing agents such as zinc stearate; organic or inorganic pigments; low shrinkage agents such as thermoplastic resins.

The resin composition impregnated in the glass fibers (D) in this invention does not contain an oxide or hydroxide of magnesium or calcium. Inclusion of such a compound leads to high water absorption and cannot give a high degree of electrical insulation.

Glass fibers cut to a suitable length of, for example, 1 to 5 cm from a chopped strand are usually employed as the glass fibers (D). A mat woven from glass fibers can also be used.

The amount of the glass fibers (D) is 40 to 75%, preferably 50 to 65%, based on the total weight of the glass fibers (D) and the resin composition comprising the unsaturated polyester (A), the polymerizable monomer (B) and the polyisocyanate compound (C), that is based on the weight of the resulting SMC.

According to this invention, by impregnating the glass fibers with the aforesaid resin composition, molding the resin-impregnated glass fibers into a sheet, and maintaining the sheet at room temperature to 60° C., the unsaturated polyester reacts with the polyisocyanate and reaches a B-stage within a short period of time (in other words, a curing reaction between the unsaturated polyester and the polymerizable monomer does not take place, but the unsaturated polyester reacts with the polyisocyanate compound to form a flexible non-tacky solid product). As a result, it is possible to obtain an SMC which is very easy to handle.

The SMC of this invention obtained in the abovedescribed manner is useful as a molding material. When heated at 100° to 160° C. in the process of molding, this SMC is cured. The SMC of this invention is especially suitable for the production of deep-draw molded articles, large-sized molded articles, and complicatedly shaped articles. It can be used, for example, in the production of automobile parts such as radiator supporters, wheels, lamp housings, bumper backup bars, and transmission supporters, and large-sized molded articles such as bath tubs, sewage tanks, and cooling towers. It can find an especially suitable application in electrical component parts to be subjected to high voltages, such as switch boxes, connectors, fuse boxes.

The following examples illustrate the present invention more specifically. It should be understood however that the invention is not limited to these specific examples.

All parts and percentages in the following examples are by weight.

EXAMPLE 1

Propylene glycol, fumaric acid and isophthalic acid were polycondensed in a customary manner in a mole ratio of 2.3/1/1 to prepare an unsaturated polyester having a hydroxyl value of 35.4 and an acid value of 11.2. To 95 parts of a solution composed of 62% of the resulting unsaturated polyester and 38% of styrene were added 2 parts of a 5% dibutyl phthalate solution of hydroquinone, 6 parts of zinc stearate and 1 part of t-butyl perbenzoate, and these materials were mixed with stirring. Then, 5.0 parts of Isonate 143L (4,4'-diphenylmethane diisocyanate having an NCO equivalent of 143, a product of Mitsubishi Chemical Co., Ltd.) was added.

Immediately then, the resulting mixture was poured and spread onto a polyethylene sheet, and 158 parts of a chopped strand (a bundle of 200 glass fibers each having a diameter of 13 microns) cut to a length of 1 inch were allowed to fall onto it and dispersed uniformly. The sheet was then folded at its center, and compressed with a rubber roller from about thereby to effect simultaneously defoaming of the resin, impregnation of the resin in the glass fibers, and formation of a sheet.

Eight hours later, the polyethylene sheet was peeled off to afford a practical SMC which was free from tackiness, was flexible and had the resin fully impregnated into the glass fibers (the mole ratio of the hydroxyl groups of the unsaturated polyester to the isocyanate groups of the diisocyanate was 1).

Then, 475 g of the resulting SMC was cut to a size of 25 cm×25 cm, and press-formed at 140° C. for 5 minutes to form molded sheets having a size of 30 cm×30 cm×3 mm.

The mechanical strengths of these molded sheets were tested, and the results are shown in Table 1.

COMPARATIVE EXAMPLE 1

To 95 parts of a solution composed of the same unsaturated polyester as in Example 1 and styrene were added 2 parts of zinc stearate, 1 part of t-butyl perbenzoate, 2 parts of a 5% dibutyl phthalate solution of hydroquinone and 1 part of a 15% aqueous solution of methanol, and these materials were stirred. Then, a solution of 2 parts of magnesium oxide in 5 parts of styrene was added.

Immediately then, the resulting mixture was poured and spread onto a polyethylene sheet, and treated in the same way as in Example 1, followed by standing for 8 hours. The resulting SMC had tackiness and was not practical. When it was aged for 16 hours in an oven at 40° C., it still had some tackiness.

The SMC was molded and tested for strength in the same way as in Example 1. The results are shown in Table 1.

COMPARATIVE EXAMPLE 2

To 80 parts of a solution composed of the unsaturated polyester used in Example 1 and styrene were added 9.0 parts of a bisphenol A/propylene oxide adduct (average molecular weight 398, hydroxyl value 282), 2 parts of zinc stearate, 1 part of t-butyl perbenzoate, and 2 parts of a 5% dibutyl phthalate solution of hydroquinone. These materials were mixed with stirring, and 11 parts of Isonate 143L was added.

A sheet was formed from the mixture in the same way as in Example 1. Sixteen hours later, the polyethylene sheet was peeled off. There was obtained a tack-free SMC (the mole ratio of the hydroxyl groups of the unsaturated polyester to the isocyanate groups of the diisocyanate was 1).

The resulting SMC was molded and tested for mechanical strengths in the same way as in Example 1. The results are shown in Table 1.

TABLE 1

| Mechanical strengths (*) | Example 1 | Comparative Example 1 | Comparative Example 2 |
|---|---|---|---|
| Flexural strength (kg/mm$^2$) | 41.5 | 35.7 | 37.1 |
| Flexural modulus (kg/mm$^2$) | 1570 | 1420 | 1500 |
| Tensile strength (kg/mm$^2$) | 24.1 | 20.8 | 22.0 |
| Tensile modulus (kg/mm$^2$) | 1600 | 1440 | 1530 |
| Compressive strength (kg/mm$^2$) | 35.3 | 26.3 | 30.8 |
| Shear strength (kg/mm$^2$) (**) | 4.44 | 3.18 | 3.90 |
| Izod impact strength (kg . cm/cm; unnotched) | 180 | 109 | 164 |
| 80° C. flexural strength (kg/mm$^2$) | 36.6 | 30.1 | 21.9 |
| Retention of flexural strength at 80° C. (%) | 88 | 84 | 59 |
| 120° C. flexural strength (kg/mm$^2$) | 28.0 | 21.1 | 9.3 |
| Retention of flexural strength at 120° C. (%) | 67 | 59 | 25 |

(*): The mechanical strengths were measured in accordance with JIS K-6911.
(**): BS-278-2, P-3, 341A

COMPARATIVE EXAMPLE 3

A molded sheet was obtained by repeating the same procedure as in Example 1 except that 3.0 parts of Isonate 143L and 2.0 parts of magnesium oxide were used instead of 5.0 parts of Isonate 143L. The electrical insulation of the molded sheet was examined, and is shown in Table 2.

TABLE 2

| Compounds added | Example 1 NCO compound (5 parts) | Comparative Example 3 NCO compound (3 parts) and MgO (2 parts) |
|---|---|---|
| Volume inherent resistivity (ohms-cm) | | |
| Immediately after molding (*1) | 50 × 10$^{15}$ | 8 × 10$^{15}$ |
| Two hours after boiling (*2) | 600 × 10$^{13}$ | 2.5 × 10$^{13}$ |
| 28 Days after molding (*3) | 450 × 10$^{13}$ | 0.9 × 10$^{13}$ |
| 168 Days after molding (*3) | 380 × 10$^{13}$ | 0.5 × 10$^{13}$ |

(*1): Measured in accordance with JIS K-6911
(*2): The molded sheet was boiled for 2 hours in boiling distilled water, and cooled for 30 minutes in flowing pure water kept at 20 ± 10° C. The water on the surface was wiped off with a dry gauze, and the volume inherent resistivity of the molded sheet was measured in accordance with JIS K-6911 after standing for 2 minutes.
(*3): Measured in accordance with ASTM D-257 after the molded sheet was allowed to stand for 28 days and 168 days at a temperature of 100° F. (37.8° C.) and a humidity of 100%.

EXAMPLE 2

Propylene oxide (3445 g; 59.4 moles), 406 g (3.5 moles) of fumaric acid and 4900 g (50 moles) of maleic anhydride were polycondensed in a customary manner to form an unsaturated polyester having a hydroxyl value of 40.2 and an acid value of 15.8 with a hydroxyl value/acid value ratio of 2.54. Styrene (3574 g), 2.3 g of benzoquinone, 2.3 g of hydroquinone and 69 g of piperidine were added to the unsaturated polyester to form a resin solution having a solids content of 71%. The solution had a hydroxyl value of 28.5 and an acid value of 11.2 with a hydroxyl value/acid value ratio of 2.54.

Isonate 143L (6.8 parts) was added to 100 parts of the resin solution. The resulting mixture was immediately poured and spread uniformly on a polyethylene sheet, and 160.2 parts of a chopped strand (composed of a bundle of 200 glass fibers having a diameter of 13 microns), cut to a length of 1 inch, was let fall onto it and uniformly dispersed. The product was then worked up in the same way as in Example 1 to form an SMC having the properties shown in Table 3.

COMPARATIVE EXAMPLE 4

An unsaturated polyester having a hydroxyl value of 55.6 and an acid value of 0.3 with a hydroxyl value/acid value ratio of 185.3 was prepared in the same way as in Example 2 except that the amount of the propylene oxide was changed to 3966 g (68.7 moles). Styrene (3782 g), 2.3 g of benzoquinone, 2.3 g of hydroquinone and 69 g of piperdine were added to the unsaturated polyester to form a resin solution. The solution had a hydroxyl value of 39.5 and an acid value of 0.2 with a hydroxyl value/acid value ratio of 197.5.

Then, an SMC was produced in the same way as in Example 2 except that the amount of Isonate 143L was changed to 9.5 parts. The properties of the resulting SMC are shown in Table 3.

TABLE 3

| | | Example 2 | Comparative Example 4 |
|---|---|---|---|
| Unsaturated polyester | Hydroxyl value | 40.2 | 55.6 |
| | Acid value | 15.8 | 0.3 |
| | Hydroxyl value/acid value ratio | 2.54 | 185.3 |
| Amount of Isonate 143L added (parts) | | 6.8 | 9.5 |
| OH/NCO mole ratio | | 1.06 | 1.06 |
| Glass fiber content (%) | | 60 | 60 |
| Properties of SMC | | | |
| Repulsive elasticity (%) (*1) | | 25.6 | 40.7 |
| Hardness (Shore A) (*1) | | 33 | 62 |
| Flowability (%) (*2) | | 320 | 15 |
| Moldability (*3) | | Conforming to the mold | Not conforming to the mold |

(*1): Measured in accordance with JIS K-6301. Higher repulsive elasticity and higher hardness cause worse moldability.
(*2): Three disc-like pieces having a diameter of 5 cm were cut out from the SMC, and pressed at 140° C. and 10 kg/cm². The enlarged area of the pressed disc-like assembly was measured, and the percentage of the enlarged area based on the area of the disc before pressing was determined. Higher percentages show better moldability.
(*3): Two SMC samples (25 cm × 25 cm each; 475 g) were charged into a mold with a size of 30 cm × 30 cm, and molded for 5 minutes at 140° C. and 100 kg/cm². The molded product was examined to determine whether it conformed to the mold.

EXAMPLE 3

The same procedure as in Example 1 was repeated except that the amounts of the glass fibers and CaCO₃ were changed as shown in Table 4. The properties of the SMC are shown in Table 4.

TABLE 4

| Run No. | I | II | III | IV | V |
|---|---|---|---|---|---|
| Resin solution | 95 | 95 | 95 | 95 | 95 |
| Zinc stearate | 2 | 2 | 2 | 2 | 2 |
| 5% Hydroquninone solution | 2 | 2 | 2 | 2 | 2 |
| t-Butyl perbenzoate | 1 | 1 | 1 | 1 | 1 |
| CaCO₃ | 120 | — | 50 | — | — |
| Isonate 143L | 5 | 5 | 5 | 5 | 5 |
| Glass fibers | 96 | 45 | 155 | 158 | 420 |
| Glass fiber content (%) | 30 | 30 | 50 | 60 | 80 |
| Impregnability | Good | Good | Good | Good | Poor |
| Moldability | Good(*1) | Poor(*3) | Good(*1) | Good(*1) | Molding(*2) failed. |
| Molded product Flexural strength (kg/cm²) | 25.0 | 19.3 | 35.7 | 41.5 | — |
| Flexural modulus (kg/cm²) | 1020 | 950 | 1450 | 1570 | — |

Note:
Runs Nos. III and IV are within the scope of the invention, and the other runs are by way of comparison.
(*1)Conforming to the mold
(*2)Not conforming to the mold
(*3)Conforming to the mold but cracked

EXAMPLES 4 TO 7 AND COMPARATIVE EXAMPLES 5 TO 8

In each run, a mixture obtained by mixing the unsaturated polyesters, styrene and Isonate 143L shown in Table 3 in the proportions indicated was poured and spread on a polyethylene sheet immediately after preparation. Then, a chopped strand (a bundle of 200 glass fibers each having a diameter of 13 microns) cut to a length of 1 inch were allowed to fall and dispersed uniformly onto the sheet so that the glass fiber content became 50%. The resulting sheet was folded at its center, and compressed with a rubber roller to effect defoaming of the resin, impregnation of the resin in the glass fibers, and formation of a sheet simultaneously. After allowing the resulting sheet to stand until it lost tackiness (that is, until it reached a B-stage), the polyethylene sheet was peeled off to form an SMC (the mole ratio of the hydroxyl groups of the unsaturated polyester to the isocyanate groups of the diisocyanate was 1). The results are shown in Table 5.

The gellation time (flow terminating time) of each of the resin composition free from glass fibers and composed of the unsaturated polyester, styrene and Isonate 143L was examined. The results are also shown in Table 5.

TABLE 5

| | | Unsaturated polyester | | | | Amount of styrene (parts) | Amount of Isonate 143L (parts) (*2) | Time required until the B-stage was reached (minutes) | Gellation time (minutes) |
|---|---|---|---|---|---|---|---|---|---|
| | Type (*1) | Amount in parts | Hydroxyl value | Acid value | Ratio of hydroxyl value/ acid value | | | | |
| Example 4 | A | 61.7 | 33.7 | 10.7 | 3.2 | 38.3 | 5.3 | 90 | 64 |
| 5 | B | 58.0 | 35.2 | 7.0 | 5.0 | 42.0 | 5.2 | 70 | 45 |
| 6 | C | 66.1 | 30.1 | 12.0 | 2.5 | 33.9 | 5.1 | 120 | 75 |
| 7 | D | 55.9 | 20.5 | 12.1 | 1.7 | 44.1 | 2.9 | 200 | 150 |
| Comparative Example 5 | E | 63.5 | 18.1 | 17.6 | 1.0 | 36.5 | 2.9 | | more than 8 hours |
| 6 | F | 69.2 | 38.4 | 36.4 | 1.1 | 30.8 | 6.8 | The sheet was tacky even after 24 hours. | more than 8 hours |
| 7 | G | 52.7 | 15.9 | 6.6 | 2.4 | 47.3 | 2.1 | | more than 8 hours |
| 8 | H | 68.5 | 36.2 | 25.9 | 1.4 | 31.5 | 6.3 | | more than 8 hours |

(*1): The mole ratios of the constituent monomers of the unsaturated polyesters A to H were as follows:
A: Propylene glycol (PG)/fumaric acid (FA)/isophthalic acid (IPA) = 2/1/1
B: PG/maleic anhydride (MAn)/phthalic anhydride (PAn) = 2/1/1
C: PG/MAn/PAn = 3/2/1
D: PG/MAn/IPA = 3/2/1
E: PG/neopentyl glycol/FA/terephthalic acid (TPA) = 2/1/2/1
F: PG/FA/IPA = 2/1/1
G: PG/MAn/IPA = 2/1/1
H: PG/FA/TPA = 2/1/1
(*2): The amount of the isocyanate used was calculated in accordance with the following equation.

$$\text{Amount (parts)} = \frac{143 \times (\text{hydroxyl value}) \times (\text{amount in parts of unsaturated polyester})}{56100}$$

As is clearly seen from Table 5, the resin compositions within the range specified in the present invention (containing the unsaturated polyesters A to D) could be gelled within short periods of time, but the resin compositions outside the range of this invention (containing the unsaturated polyesters E to H) could not be gelled even after a lapse of 8 hours.

Compounds shown in Table 6 were prepared using the unsaturated polyesters A, B, D and E used in Examples 4, 5 and 7 and Comparative Example 5. Variations in the viscosity of the compounds with the progress of a reaction between the unsaturated polyester and the polyisocyanate, the hardnesses of the solid products after 24 hours, and the presence or absence of tackiness in the solid products after 24 hours were determined. The results are summarized in Table 6.

TABLE 6

| | | Example | | | Comparative |
|---|---|---|---|---|---|
| | | 4 | 5 | 7 | Example 5 |
| Formation (parts) | Unsaturated polyester A | 100 | — | — | — |
| | Unsaturated polyester B | — | 100 | — | — |
| | Unsaturated polyester D | — | — | 100 | — |
| | Unsaturated polyester E | — | — | — | 100 |
| | Calcium carbonate | 100 | 100 | 100 | 100 |
| | Isonate 143L | 5.3 | 5.2 | 2.9 | 2.9 |
| Viscosity (*1) (poises) | After 0 hour | 125 | 150 | 240 | 104 |
| | After 0.5 hour | 250 | 380 | 370 | 150 |
| | After 1.0 hour | 510 | 790 | 650 | 195 |
| | After 2.0 hours | 12,000 | 105,000 | 1,200 | 410 |
| | After 4.0 hours | Unmeasurable | Unmeasurable | 3,750 | 1,250 |
| | After 8.0 hours | — | — | 19,000 | 2,700 |
| Hardness after 24 hours (*2) | | 42 | 50 | 38 | 20 |
| Tackiness after 24 hours | | Non-tacky | Non-tacky | Non-tacky | Very tacky |

(*1): Measured by a B-type viscometer at 23° C.
(*2): Shore A hardness values

EXAMPLES 8 TO 10 AND COMPARATIVE EXAMPLES 9 AND 10

The same solution of unsaturated polyester and styrene as used in Example 1 was mixed with Isonate 143L in the proportions shown in Table 7. An SMC was produced from the resulting mixture in the same way as in Example 4, and the time required until the product reached the B-stage was examined.

The gellation time of the resin composition not containing glass fibers was examined in the same way as in Example 4. The results are shown in Table 7.

TABLE 7

| | | Amount of the solution of unsaturated polyester and styrene (parts) | Amount of Isonate 143L (parts) | Mole ratio of OH of the unsaturated polyester to NCO of the diisocyanate | Time required until the B-stage was reached (minutes) | Gellation time (minutes) |
|---|---|---|---|---|---|---|
| Example | 8 | 100 | 7.0 | 0.8 | 180 | 125 |
| | 9 | 100 | 5.6 | 1 | 120 | 70 |
| | 10 | 100 | 4.7 | 1.2 | 90 | 60 |
| Comparative Example | 9 | 100 | 11.2 | 0.5 | Tacky even after 24 hours | More than 8 hours |
| | 10 | 100 | 3.7 | 1.5 | Tacky even after 24 hours | More than 8 hours |

What we claim is:

1. A process for producing an easily handleable sheet molding compound which comprises impregnating glass fibers with a resin composition comprising (A) an unsaturated polyester having a hydroxyl value of 20 to 55 and an acid value of 5 to 20 with a hydroxyl value/acid value ratio of from 1.7 to 10, (B) a polymerizable monomer and (C) a polyisocyanate compound having not more than 20 carbon atoms excepting the carbon atoms of the isocyanate groups and selected from the group consisting of diisocyanates and polymethylenepolyphenyl isocyanates, the proportions of the unsaturated polyester (A) and the polyisocyanate compound (C) being such that the mole ratio of the hydroxyl groups of the unsaturated polyester (A) to the isocyanate groups of the polyisocyanate compound (C) is from 0.7 to 1.3, and said composition being free from an oxide or hydroxide of magnesium or calcium, said impregnation being effected so that the glass fiber content becomes 40 to 75% by weight; and molding the resin-impregnated glass fibers into a sheet.

2. The process of claim 1 wherein said unsaturated polyester (A) is obtained by reacting an alpha, beta-unsaturated dibasic acid or both the alpha, beta-unsaturated dibasic acid and a saturated dibasic acid with a polyhydric alcohol.

3. The process of claim 1 wherein said polymerizable monomer (B) is a compound having an unsaturated double bond in the molecule and being liquid at ordinary temperature.

4. The process of claim 1 wherein said diisocyanate compounds (C) are expressed by the general formula

OCN—R—NCO wherein R represents an alkylene group containing not more than 20 carbon atoms, a phenylene group; an alkyl-substituted phenylene group; a xylylene group; a diphenylene group; a diphenylene group with the phenylene groups bonded through an oxygen atom, a sulfur atom or an alkylene group; a naphthylene group, or a cyclohexylene group.

5. A molded article having high electrical insulation and high strength prepared by molding the sheet molding compound obtained by the process of claim 1.

UNITED STATES PATENT AND TRADEMARK OFFICE
CERTIFICATE OF CORRECTION

PATENT NO. : 4,327,145
DATED : April 27, 1982
INVENTOR(S) : Mitani et al.

It is certified that error appears in the above—identified patent and that said Letters Patent is hereby corrected as shown below:

On the first page the Assignee should be

Dainippon Ink & Chemicals, Inc., instead of Dainippon [Inc.] & Chemicals, Inc.

Signed and Sealed this

Seventeenth Day of August 1982

[SEAL]

Attest:

GERALD J. MOSSINGHOFF

Attesting Officer   Commissioner of Patents and Trademarks